United States Patent Office 3,809,664
Patented May 7, 1974

---

3,809,664
METHOD OF PREPARING STARCH GRAFT POLYMERS
George F. Fanta and Robert C. Burr, Peoria, Ill., assignors to the United States of America as represented by the Secretary of Agriculture
No Drawing. Filed Aug. 16, 1973, Ser. No. 388,853
Int. Cl. C08b 25/02
U.S. Cl. 260—17.4 GC                10 Claims

ABSTRACT OF THE DISCLOSURE

A wide variety of starch graft polymers are prepared from water-soluble ethylenically unsaturated monomers in admixture with selected amounts of starch and water by adding the admixture to a hot, water-immiscible solvent.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to the preparation of copolymeric products containing starch and a polymerized unsaturated compound. More specifically the invention relates to a method for the preparation of starch graft polymers wherein the graft polymer is from a water-soluble ethylenically unsaturated monomer.

There are several known methods for grafting polymerizable compounds onto starch including free radical initiation, anionic initiation, and initaton by mechancal stress (Advances in Macromolecular Chemistry, vol. 2, ed. W. M. Pasika, Academic Press, London and New York, 1970, pp. 1–87; and Block and Graft Copolymers, vol. 1, ed R. J. Ceresa, John Wiley and Sons, London, New York, Sydney, and Toronto, 1973, pp. 1–45).

Free radical initiation is accomplished by generating free radicals on the starch molecule with chemical catalysts or with irradiation from a gamma or electron beam source. Chemical catalysts require procedures for their separation from the product and irradiation requires complex and expensive equipment. Several difficult reactions are necessary in order to initiate polymerization by anionic means, and ballmills, jet cookers, or freeze-thaw equipment is needed for mechanical initiation.

Products prepared by these methods have found uses which include paper filler retention aids, adhesives, sizings, flocculants, and ion-exchange resins (U.S. 3,135,738; 3,640,925; 3,095,391; Advances in Macromolecular Chemistry, supra; and Block and Graft Copolymers, supra).

We have discovered a simple and novel method of preparing starch graft polymers having essentially the same properties and utilities as those described in the above-mentioned references. The method first comprises the preparation of an admixture of starch, a water-soluble ethylenically unsaturated monomers, and water wherein the ratio of monomer to water is from 0.003 to 0.006 mole per milliliter, the ratio of starch to water is from 0.003 to 0.012 anhydroglucose unit (AGU) per milliliter, and the ratio of monomer to starch is from 0.25 to 2 moles per AGU. The admixture is then quickly added to a medium- to high-boiling, water-immiscible solvent which has been previously heated to from 80° to 175° C. The amount of solvent should be at least two times the total volume of the admixture and the monomer should be insoluble in the water-immiscible solvent.

This method has the advantages of using no catalysts that require removal from the product, and of needing no specific equipment.

DETAILED DESCRIPTION OF THE INVENTION

Starch graft polymerization reactions of the instant invention take place when the admixture of starch, monomer, and water comes in contact with the hot solvent. Although the mechanism is not clear, polymerization is apparently initiated by means of free radicals.

Starch used in the reaction includes any ungelatinized starch or starch derivative on which free radicals can be formed.

Suitable monomers must have ethylenically unsaturated sites amenable to free radical polymerization, must be water soluble, and must be insoluble in the hot solvent. Monomers of this type include acrylamide, substituted acrylamides such as N-methylolacrylamide and N-methylacryamide, methacrylamide, N-methylmethacrylamide, ethylenically unsaturated quaternary ammonium salts such as N,N,N-trimethylaminoethylmethacrylate methyl sulfate or halide, N,N,N-trimethylaminoethylacrylate methyl sulfate or halide, 2-hydroxy-3-methacryloxypropyltrimethylammonium methyl sulfate or halide, vinylbenzyl trialkylammonium methyl sulfate or halide, diallyl dialkylammonium methyl sulfate or halide, and vinylpyridinium quaternary methyl sulfate or halide, and mineral acid salts of ethylenically unsaturated amine compounds such as dimethylaminoethylmethacrylate or acrylate, t-butylaminoethylmethacrylate or acrylate, and vinylpyridine. Those skilled in the art will be aware of other monomers that will be suitable in accordance with the invention.

Since the point of invention seems to lie in the quick addition of the reactants to hot solvents, the choice of suitable solvents becomes important. There are three critical limitations that a suitable solvent must meet:

(1) The solvent must be water immiscible;
(2) The solvent must not dissolve the monomer; and
(3) The solvent must have a boiling point at or above the reaction temperature.

Most nonpolar solvents are water immiscible and there fore meet the first criterion, and a proper choice of monomer will easily meet the second criterion. Solvents boiling between 80° to 200° C. meet the criterion of being at or above the reaction temperature. This temperature range falls generally within the definitions of "medium-boiling" to "high-boiling" solvents (Hackh's Chemical Dictionary, 4th edition, Ed. Julius Grant, McGraw-Hill Book Company, New York, N.Y., 1969). Solvents suitable for use in the instant method include benzene, toluene, xylene, heptane, octane, nonane, and isooctane. Other solvents will be known by those skilled in the art.

Starch graft polymers having monomer add-ons comparable to those products described in the prior art are prepared according to the invention when monomer and starch are present in a ratio of about 0.25 to 2 moles of monomer per anhydroglucose unit of starch. Higher add-ons could be achieved by monomers with high solubilities in water. However, there are certain limitations to the amounts of water present in the reaction. The lower limit of water appears to be the minimum amount that is necessary to swell the starch to a gelatinous mass. That is a ratio of starch to water of about 0.012 AGU per milliliter. The preferred ratios of starch to water are from 0.003 to 0.012. The maximum amount of water is regulated by the amount of monomer. As the dilution of monomer increases the amount of add-on decreases. A reaction performed according to the invention which contained the reactants in amounts such that the ratios of monomer to water was 0.003 mole per milliliter resulted in a product having a polymer add-on of only 7.5 percent by weight, while the same reaction condition with a monomer to water ratio of 0.006 mole per milliliter resulted in a product having a polymer add-on of 41 percent. The preferred ratios of monomer to water are from 0.003 to 0.006 mole per milliliter.

The amount of hot solvent present in the reaction mixture is also related to the amount of water present, but this relationship is best described in terms of total admixture of starch, monomer, and water. If the ratio of admixture to hot solvent is too large, the water in the admixture will cool the reaction temperature to a point where the reaction will not be initiated. The minimum amount of solvent was determined to be at least about two times the volume of the total admixture. There is no upper limit on the ratio of solvent to admixture. It is theoretically obvious that an amount of solvent which was infinitely greater than the amount of admixture would still initiate the reaction. However, for practical reasons the preferred amount of solvent is from about two to 10 times the volume of admixture.

For reactions performed at atmospheric pressure, temperature of the solvent was determined to be from about 80° to 175° C. The preferred temperature is from 100° to 110° C. At these temperatures the reaction appears to be complete as soon as the admixture comes in contact with the hot solvent. However, it is preferable to maintain the temperature for about 15 min.

The term "admixture" is herein used to mean a thoroughly stirred mixture, and the phrase "quickly adding the admixture" is meant to mean adding the stirred mixture before the components separate. This assures that all components will be in close proximity to one another when they come in contact with the hot solution.

The following examples are to further illustrate the above disclosure and should not be construed as limiting the invention as defined in the claims.

EXAMPLE 1

An admixture was prepared by rapidly stirring 32.4 g. [dry basis (d.b.), 0.2 AGU] of a commercial starch, 32.4 g. water, and 47.5 g. (0.2 mole) of 2-hydroxy-3-methacryloyloxypropyltrimethylammonium chloride. The admixture was poured in one portion into 350 ml. of xylene which was being continuously stirred and which had been previously deaerated with bubbling nitrogen and heated to 105° C. After 15 min. the heat was removed, and the mixture was allowed to cool to room temperature while continuously stirring.

The xylene was removed and about 1 g. of hydroquinone added to the hard rubbery solid and the mixture blended. About 250 ml. of 95 percent ethanol was added to the dispersion, the mixture blended, allowed to settle, and the supernatant removed. The ethanol wash was repeated and the recovered solid was dried overnight at 60° in a vacuum oven. The product weighed 55.7 g. (d.b.). The supernatants were combined and solids removed. The product and the supernatant solids were analyzed for nitrogen, and the percent by weight polymer attached to the starch, percent total conversion of monomer, and grafting efficiency were determined. Grafting efficiency is the percentage of total polymer which was grafted to the starch (see Table 1).

EXAMPLE 2

Example 1 was repeated except that the reaction temperature was maintained at 80° C. instead of 105° C. The product was recovered and analyzed as in Example 1 (see Table 1).

EXAMPLE 3

Example 1 was repeated except that 0.1 mole instead of 0.2 mole of 2-hydroxy-3-methacryloyloxypropyltrimethylammonium chloride was used. The product was recovered and analyzed as in Example 1 (see Table 1).

EXAMPLE 4

Example 1 was repeated except 0.6 mole of acrylamide was used instead of the 0.2 mole of 2-hydroxy-3-methacryloyloxypropyltrimethylammonium chloride. The product was recovered and analyzed as in Example 1 (see Table 1).

EXAMPLE 5

Example 1 was repeated except that 0.6 mole of acrylic acid was used instead of the 0.2 mole of 2-hydroxy-3-methacryloyloxypropyltrimethylammonium chloride. The product was recovered and extent of reaction determined by weight gain (see Table 1).

EXAMPLE 6

Example 1 was repeated except that 0.25 mole of sodium acrylate was used instead of the 0.2 mole of 2-hydroxy-3-methacryloyloxypropyltrimethylammonium chloride. Acrylic acid (0.25 mole) plus 0.25 mole of sodium hydroxide were added to the admixture to form the sodium acrylate. The product was recovered by adjusting the pH of the water suspension after removal of xylene to a pH of 1.8 with dilute HCl, and washing with 95 percent ethanol as in Example 1. Extent of reaction was determined by weight gain (see Table 1).

EXAMPLE 7

Example 1 was repeated except that ethylene glycol was used as the solvent instead of xylene. The product was recovered and analyzed as in Example 1 (see Table 1).

EXAMPLE 8

For comparative purposes, 0.3 AGU of starch in 425 ml. of water at 25° C. was irradiated with a total dose of 1.0 mrad. with a cobalt 60 source. The irradiated starch was reacted with 0.2 mole of 2-hydroxy-3-methacryloyloxypropyltrimethylammonium chloride under nitrogen for 2 hr. at 25° C. and terminated with 1 g. of hydroquinone. The product was recovered by removing the water and washing twice with 95 percent ethanol, and analyzed as in Example 1 (see Table 1).

EXAMPLE 9

For comparative purposes, 0.3 AGU of starch in 425 ml. of water and $3 \times 10^{-3}$ mole of ceric ammonium nitrate and 0.3 mole of 2-hydroxy-3-methacryloyloxypropyltrimethylammonium chloride at room temperature was reacted and recovered as described by Fanta et al., J. Appl. Polym. Sci. 15: 2651 (1971) and analyzed as in Example 1 (see Table 1).

TABLE 1

| Example | Method of initiation | Monomer | Add-on, percent by weight | Total conversion of monomer, percent by weight | Grafting efficiency, percent by weight |
|---|---|---|---|---|---|
| 1 | Xylene, 105° C | A[1] | 41 | 63 | 78 |
| 2 | Xylene, 80° C | A[1] | 8.5 | | |
| 3 | Xylene, 105° C | A[1] | 9.5 | 20 | 69 |
| 4 | do | Acrylamide | 9.5 | | |
| 5 | do | Acrylic acid | 0 | 0 | 0 |
| 6 | do | Na acrylate | 0 | 0 | 0 |
| 7 | Ethylene glycol, 105° C | A[1] | 0 | 0 | 0 |
| 8 | Co[60] irradiation | A[1] | 20 | 66 | 33 |
| 9 | Ce[+4] catalyst | A[1] | 35 | 86 | 31 |

[1] 2-hydroxy-3-methacryloyloxypropyltrimethylammonium chloride.

We claim:

1. A method of preparing starch graft polymers which comprises preparing an admixture of starch, a water-soluble ethylenically unsaturated monomer, and water wherein the ratio of monomer to water is from 0.003 to 0.006 mole per milliliter, the ratio of starch to water is from 0.003 to 0.012 anhydroglucose unit (AGU) per milliliter, and the ratio of monomer to starch is from 0.25 to 2 moles per AGU; then quickly adding said admixture to a medium- to high-boiling, water-immiscible solvent previously heated to from 80° to 175° C., the water-immiscible solvent being present in an amount equal to at least two times the total volume of said admixture, and said monomer being insoluble in the water-immiscible solvent.

2. A method of preparing starch graft polymers as described in claim 1 wherein the water-soluble ethylenically unsaturated monomer is selected from the group consisting of acrylamide, N-methylolacrylamide, N-methyacrylamide, methacrylamide, N-methylmethacrylamide, N,N,N-trimethylaminoethylmethacrylate methyl sulfate or halide, N,N,N-trimethylaminoethylacrylate methyl sulfate or halide, 2-hydroxy - 3 - methacryloyloxypropyltrimethylammonium methyl sulfate or halide, vinylbenzyl trialkylammonium methyl sulfate or halide, diallyl dialkylammonium methyl sulfate or halide, vinylpyridinium quaternary methyl sulfate or halide, dimethylaminoethylmethacrylate mineral acid salt.

3. A method of preparing starch graft polymers as described in claim 1 wherein the water-immiscible solvent is present in an amount equal to two to 10 times the total volume of said admixture.

4. A method of preparing starch graft polymers as described in claim 2 wherein the water-soluble ethylenically unsaturated monomer is selected from the group consisting of acrylamide, N-methylolacrylamide, N-methylacrylamide, methacrylamide, and N-methylmethacrylamide.

5. A method of preparing starch graft polymers as described in claim 2 wherein the water-soluble ethylenically unsaturated monomer is selected from the group consisting of N,N,N-trimethylaminoethylmethacrylate methyl sulfate or halide, N,N,N-trimethylaminoethylacrylate methyl sulfate or halide, 2-hydroxy-3-methacryloyloxypropyltrimethylammonium methyl sulfate or halide, vinylbenzyl trialkylammonium methyl sulfate or halide, diallyl dialkylammonium methyl sulfate or halide, and vinylpyridinium quaternary methyl sulfate or halide.

6. A method of preparing starch graft polymers as described in claim 2 wherein the water-soluble ethylenically unsaturated monomer is selected from the group consisting of dimethylaminoethylmethacrylate mineral acid salt, t-butylaminoethylmethacrylate mineral acid salt, and vinylpyridine mineral acid salt.

7. A method of preparing starch graft polymers as described in claim 2 wherein the water-soluble ethylenically unsaturated monomer is acrylamide.

8. A method of preparing starch graft polymers as described in claim 2 wherein the water-soluble ethylenically unsaturated monomer is 2-hydroxy-3-methacryloyloxypropyltrimethylammonium halide.

9. A method of preparing starch graft polymers as described in claim 3 wherein the water-soluble ethylenically unsaturated monomer is selected from the group consisting of acrylamide, N-methylolacrylamide, N-methylacrylamide, methacrylamide, N-methylmethacrylamide, N,N,N-trimethylaminoethylmethacrylate methyl sulfate or halide, N,N,N-trimethylaminoethylacrylate methyl sulfate or halide, 2 - hydroxy-3-methacryloyloxypropyltrimethylammonium methyl sulfate or halide, vinylbenzyl trialkylammonium methyl sulfate or halide, diallyl dialkylammonium methyl sulfate or halide, vinylpyridinium quaternary methyl sulfate or halide, dimethylaminoethylmethacrylate mineral acid salt, t-butylaminoethylmethacrylate mineral acid salt, vinylpyridine mineral acid salt, and mixtures of the above.

10. The method of preparing starch graft polymers as described in claim 3 wherein the water-immiscible solvent is xylene.

References Cited
UNITED STATES PATENTS

| | | | |
|---|---|---|---|
| 3,095,391 | 6/1963 | Brockway et al. | 260—17.4 |
| 3,640,925 | 2/1972 | Touzinsky et al. | 260—17.4 |
| 3,687,878 | 8/1972 | Imoto et al. | 260—17.4 |

WILLIAM H. SHORT, Primary Examiner

E. WOODBERRY, Assistant Examiner